US009869871B2

(12) United States Patent
Chen et al.

(10) Patent No.: US 9,869,871 B2
(45) Date of Patent: Jan. 16, 2018

(54) PARALLAX BARRIER AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Changdi Chen, Beijing (CN); Yiyong Luo, Beijing (CN); Tao Yang, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 8 days.

(21) Appl. No.: 15/021,864

(22) PCT Filed: Nov. 2, 2015

(86) PCT No.: PCT/CN2015/093563
§ 371 (c)(1),
(2) Date: Mar. 14, 2016

(87) PCT Pub. No.: WO2016/176973
PCT Pub. Date: Nov. 10, 2016

(65) Prior Publication Data
US 2017/0160555 A1 Jun. 8, 2017

(30) Foreign Application Priority Data

May 6, 2015 (CN) .......................... 2015 1 0227129

(51) Int. Cl.
G02B 27/22 (2006.01)
H04N 13/04 (2006.01)

(52) U.S. Cl.
CPC ......... *G02B 27/2214* (2013.01); *G02B 27/22* (2013.01); *H04N 13/0409* (2013.01)

(58) Field of Classification Search
CPC . G02B 27/2214; G02B 27/22; H04N 13/0409
(Continued)

(56) References Cited

U.S. PATENT DOCUMENTS

2009/0096811 A1* 4/2009 Tanaka ............... G02B 27/0101
345/629
2009/0257119 A1* 10/2009 Uehara ............... G02B 27/2214
359/463
(Continued)

FOREIGN PATENT DOCUMENTS

CN 1893672 A 1/2007
CN 101231414 A 7/2008
(Continued)

OTHER PUBLICATIONS

Office Action in Chinese Patent Application No. 201510227129.0, dated Oct. 10, 2016.
(Continued)

Primary Examiner — William R Alexander
(74) Attorney, Agent, or Firm — Brooks Kushman P.C.

(57) ABSTRACT

The present disclosure provides a parallax barrier and a display device. The parallax barrier is configured to achieve 3D display using a slit grating, and includes a plurality of first stripes separated from, and arranged parallel to, each other, and a plurality of second stripes each arranged between the adjacent first stripes. Each first stripe has light transmittance greater than zero and less than that of the light-transmissible stripe.

20 Claims, 2 Drawing Sheets

(58) Field of Classification Search
USPC .......................................................... 359/475
See application file for complete search history.

(56) References Cited

U.S. PATENT DOCUMENTS

| | | | | |
|---|---|---|---|---|
| 2011/0304909 | A1* | 12/2011 | Lu ..................... | H04N 13/0409 359/463 |
| 2012/0038632 | A1* | 2/2012 | Matsunaga ........ | G02B 27/2214 345/419 |
| 2012/0162212 | A1* | 6/2012 | Takahashi .......... | H04N 13/0404 345/419 |
| 2012/0170115 | A1 | 7/2012 | Zhang et al. | |
| 2012/0243083 | A1* | 9/2012 | Takama ............. | G02B 27/2214 359/462 |
| 2013/0021561 | A1* | 1/2013 | Ahn .................. | G02F 1/133512 349/77 |
| 2013/0176511 | A1* | 7/2013 | Hoshino ............ | G02B 27/2214 349/15 |
| 2013/0201091 | A1* | 8/2013 | Hung ..................... | G02B 27/22 345/102 |
| 2013/0235097 | A1* | 9/2013 | Eguchi ............... | G02B 27/2214 345/697 |
| 2013/0250568 | A1* | 9/2013 | Koito ........................ | F21V 9/00 362/231 |
| 2014/0063209 | A1* | 3/2014 | Watanabe .......... | H04N 13/0409 348/51 |
| 2015/0036211 | A1* | 2/2015 | Chen .................. | G02B 27/2214 359/462 |

FOREIGN PATENT DOCUMENTS

| | | |
|---|---|---|
| CN | 102566060 A1 | 7/2012 |
| CN | 102681174 A | 9/2012 |
| CN | 102830496 A | 12/2012 |
| CN | 103064192 A | 4/2013 |
| CN | 103424924 A | 12/2013 |
| CN | 203365858 U | 12/2013 |
| CN | 103984107 A | 8/2014 |
| CN | 104516044 A | 4/2015 |
| CN | 104820294 A | 8/2015 |
| JP | H07-261119 A | 10/1995 |
| JP | 2014-102411 A | 6/2014 |

OTHER PUBLICATIONS

"3D stereoscopic photography," pp. 226-227 <https://vpn.hw.sipo/proxy*51873186/n/print.jsp> retrieved Sep. 22, 2016.

Chen Yipeng, "Development and Test of 3D Display Liquid Crystal Shutter," Thesis, University of Electronic Science and Technology of China, 2013.

Ming Zhang et al., "Technique of nano-grating fabricated by AFM," Optical Technique, vol. 32, No. 3, May 2006, pp. 330-336.

International Search Report and Written Opinion in PCT International Application No. PCT/CN2015/093563, dated Jan. 25, 2016.

Second Office Action for Chinese Application No. 201510227129.0, dated May 27, 2017, 6 Pages.

* cited by examiner

PARALLAX BARRIER AND DISPLAY DEVICE

CROSS-REFERENCE TO RELATED APPLICATION

This application is the U.S. national phase of PCT Application No.PCT/CN2015/093563 filed on Nov. 2, 2015, which claims priority to Chinese Patent Application No. 201510227129.0 filed on May 6, 2015, the disclosure of which is incorporated in its entirety by reference herein.

TECHNICAL FIELD

The present disclosure relates to the field of three-dimensional (3D) display technology, in particular to a parallax barrier and a display device.

BACKGROUND

Nowadays, 3D display technologies have gradually become standard configuration in the market. Among them, a naked-eye 3D display technology, as a mainstream, mainly includes a Parallax Barrier technology, a Lenticular Screen technology and a Directional Backlight technology. However, considering a compatibility with a liquid crystal display (LCD) process as well as the production cost, the Parallax Barrier technology is commonly used nowadays.

As shown in FIG. 1, a parallax barrier 20', i.e., a slit grating, includes opaque stripes 21' and light-transmissible stripes 22' each arranged between the adjacent opaque stripes 21'. Each light-transmissible stripe 22' corresponds to one slit of the slit grating, and the slits are usually of an identical width and arranged at an identical interval. Generally, the slit grating consists of a large number of scores formed on a glass sheet and arranged parallel to each other. The scores are just the opaque stripes 21', and portions of the glass sheet between the adjacent opaque stripes 21' are light-transmissible and thus forms the light-transmissible stripes 22', i.e., the slits. There are a large number of slits for the slit grating, and usually, there are dozens to several thousands of slits per millimeter. Especially for a refined slit grating, there are several thousands to even more than ten thousands of scores 21' per centimeter.

A principle for using the parallax barrier 20' to achieve 3D display will be described hereinafter. Pixels on a display panel 10' are viewed at viewing points to through the light-transmissible stripes 22' of the parallax barrier 20'. As shown in FIG. 1, different pixels on the display panel 10' are viewed by a left eye 11' and a right eye 12' of a viewer at the viewing point, so as to form parallax images which are then combined by the viewer's brain into a stereo image, and thereby achieve the 3D display.

As can be seen from the principle of the parallax barrier, two halves of the pixels may be viewed by the viewer's left and right eyes respectively. As a result, the resolution and brightness of a display screen are each reduced by a half, and thus the display quality thereof is unsatisfactory. In addition, the resultant power consumption is relatively high.

SUMMARY

An object of the present disclosure is to provide a parallax barrier and a display device, so as to improve the resolution and the brightness for the parallax barrier 3D display.

In one aspect, the present disclosure provides in some embodiments a parallax barrier, including a plurality of first stripes separated from, and arranged parallel to, each other, and a plurality of second stripes each arranged between the adjacent first stripes. Each second stripe is a light-transmissible stripe. Each first stripe has light transmittance less than that of the light-transmissible stripe, and the light transmittance of the first stripe is greater than zero and less than or equal to 10%.

Alternatively, the first stripes are of an identical width, and the light-transmissible stripes are of an identical width.

Alternatively, the parallax barrier further includes a transparent substrate, wherein the first stripes are arranged on the transparent substrate, and the light-transmissible stripes are formed on portions of the transparent substrate between the adjacent first stripes.

Alternatively, each first stripe is made of polycarbonate.

Alternatively, each first stripe has the light transmittance of 5%.

Alternatively, the light-transmissible stripe has the light transmittance of greater than 95%.

Alternatively, the light transmittance is a ratio of an intensity of a light beam that has been incident on and transmitted through each first stripe or light-transmissible stripe to an intensity of the incident light beam.

Alternatively, the transparent substrate is a glass substrate, an organic resin substrate or a quartz substrate.

In another aspect, the present disclosure further provides a display device including a display panel and the above-mentioned parallax barrier.

Alternatively, the parallax barrier is arranged at a side of the display panel for displaying an image.

Alternatively, the display device further includes a backlight source, and the parallax barrier is arranged between the display panel and the backlight source or at a side of the display panel away from the backlight source.

According to the embodiments of the present disclosure, the parallax barrier is used to achieve the 3D display using a slit grating. Each first stripe arranged between the adjacent light-transmissible stripes has the light transmittance greater than zero, so as to enable all the pixels to be viewed by both a left eye and a right eye of a viewer, and thus improve the resolution and brightness for the 3D display and reduce the power consumption. In addition, each first stripe has the light transmittance less than that of the light-transmissible stripe, so as to generate parallax images for the left and right eyes respectively, thereby to generate a stereo image by the viewer's brain and achieve the 3D display. Furthermore, all the pixels may be viewed by both the left eye and the right eye of the viewer, so it is able to prevent the occurrence of a blind region for an existing parallax barrier where no stereo image can be viewed.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
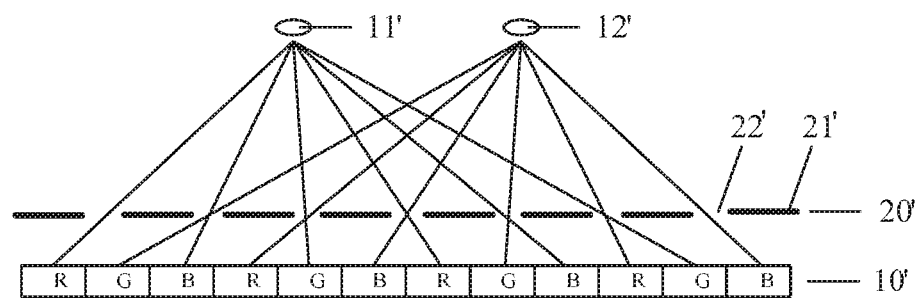
FIG. 1 is a schematic view showing a principle for existing parallax barrier 3D display.

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, some technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the following, it is clearly and completely described the technical solutions according to the embodiments of the present disclosure. It is obvious that the described embodiments are merely some of all the embodiment of the present disclosure instead of all the embodiment, and based on these embodiments, a person skilled in the art may obtain other embodiments, which also fall within the scope of the present disclosure.

A parallax barrier, which generates a parallax image using a slit grating, is used to achieve naked-eye 3D display. Usually, the slit grating consists of a plurality of parallel slits having an identical width and spaced apart from each other at an identical interval. The slits are light-transmissible stripes, and a light-shielding stripe is arranged between the adjacent slits. A principle for using the parallax barrier to achieve 3D display will be described hereinafter. Pixels on a display panel are viewed at a viewing point through the light-transmissible stripes of the parallax barrier, and different pixels on the display panel are viewed by a left eye and a right eye of a viewer at the viewing point, so as to form parallax images which are then combined by the viewer's brain into a stereo image, and thereby achieve the 3D display.

For the existing parallax barrier 3D display, two halves of the pixels may be viewed by the viewer's left and right eyes respectively. As a result, the resolution and brightness of a display screen are each reduced by a half, and thus the display quality thereof is unsatisfactory. In addition, the resultant power consumption is relatively high.

In order to solve the above-mentioned drawbacks, the present disclosure provides in some embodiments a parallax barrier, so as to form parallax images using a slit grating, and thereby achieve the 3D display. The parallax barrier includes a plurality of first stripes separated from, and arranged parallel to, each other, and a plurality of second stripes each arranged between the adjacent first stripes. Each second stripe is a light-transmissible stripe and corresponds to a slit of the slit grating. Each first stripe has light transmittance which is less than that of the light-transmissible stripe. In this way, different pixels may be viewed by a left eye and a right eye of a viewer, so as to form parallax images which are then combined by the viewer's brain to form a stereo image, and achieve the 3D display. In addition, the light transmittance of the first stripe is arranged to be greater than zero, so that all the pixels may be viewed by both the left eye and the right eye of the viewer. As compared with the existing parallax barrier, it is able to improve the resolution and brightness for the 3D display, as well as to reduce the power consumption.

Meanwhile, for the existing parallax barrier, two halves of the pixels are merely viewed by the left and right eyes of the viewer respectively, which may be implemented only within a predetermined viewing region, i.e., there is a blind region where the stereo image cannot be viewed. In contrast, all the pixels may be viewed by both the left and right eyes of the viewer using the parallax barrier in the embodiments of the present disclosure, i.e., there is no blind region where the stereo image cannot be viewed.

A principle for the parallax barrier in the embodiments of the present disclosure will be described hereinafter. The light-transmissible stripes of the slit grating each has the light transmittance different from that of each first stripe arranged between the adjacent light-transmissible stripes, so as to enable different pixels to be viewed by both the left and right eyes of the viewer and to form parallax images which are then combined by the viewer's brain into a stereo image, and thereby achieve the 3D display. In addition, each first stripe has the light transmittance greater than zero, so as to enable the left and right eyes of the viewer to view all the pixels, thereby to improve the resolution and the brightness for the 3D display, reduce the power consumption, and prevent the occurrence of a blind region where the stereo image cannot be viewed.

Figure 2:
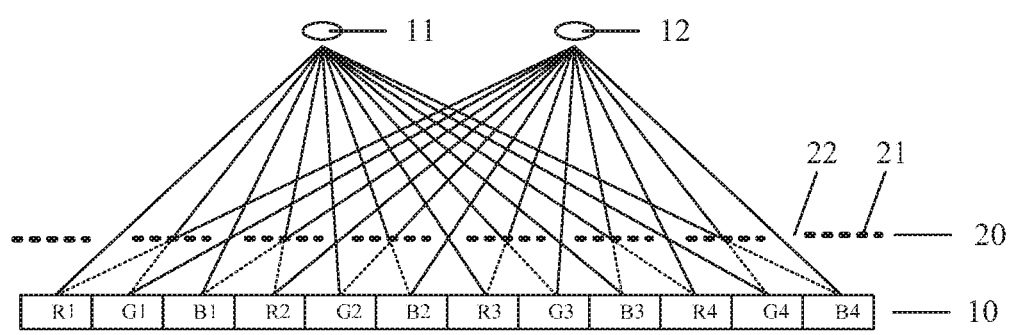
FIG. 2 is a schematic view showing a principle for parallax barrier 3D display according to one embodiment of the present disclosure.

As shown in FIG. 2, the first stripes 21 each have light transmittance of 5%, and the light-transmissible stripes 22 each have light transmittance of 100%. The light-transmissible stripes 22 have an identical width and are separated from each other at an identical interval. The pixels viewed by the left eye 11 of the viewer include R1+B1+G2+1/2 (G1+R2+B2)+R3+B3+G4+1/2 (G3+R4+B4), and the pixels viewed by the right eye 12 of the viewer include G1+R2+B2+1/2 (R1+B1+G2)+G3+R4+B4+1/2 (R3+B3+G4). Obviously, the pixels viewed by the left eye are different from the pixels viewed by the right eye, so as to form the parallax images. In addition, all the pixels can be viewed by both the left eye and the right eye of the viewer.

When the parallax barrier in the embodiments of the present disclosure is applied to a display device for the 3D display, it is able to improve the resolution and brightness of the 3D display device, reduce the power consumption, and prevent the occurrence of the blind region where the stereo image cannot be viewed.

The present disclosure will be further described hereinafter in conjunction with the drawings and embodiments.

The following embodiments are for illustrative purposes only, but shall not be used to limit the scope of the present disclosure.

Figure 3:
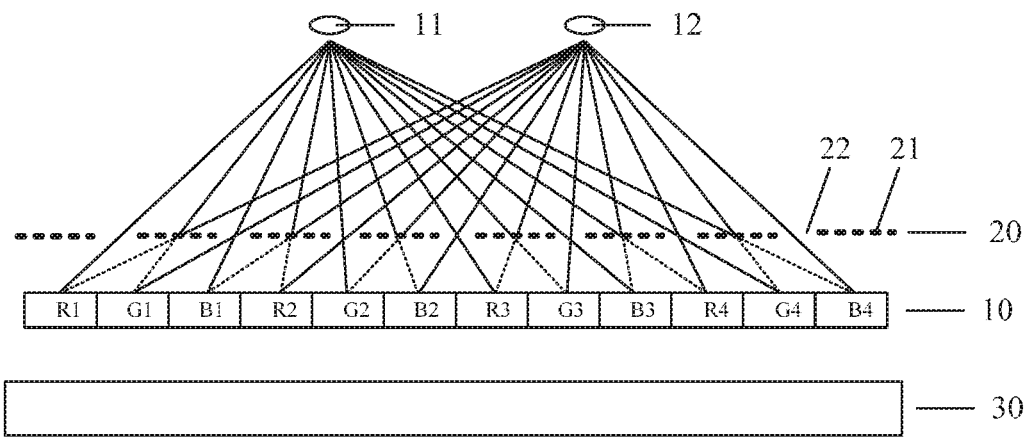
FIG. 3 is another schematic view showing the principle for the parallax barrier 3D display according one embodiment of the present disclosure.
Figure 4:
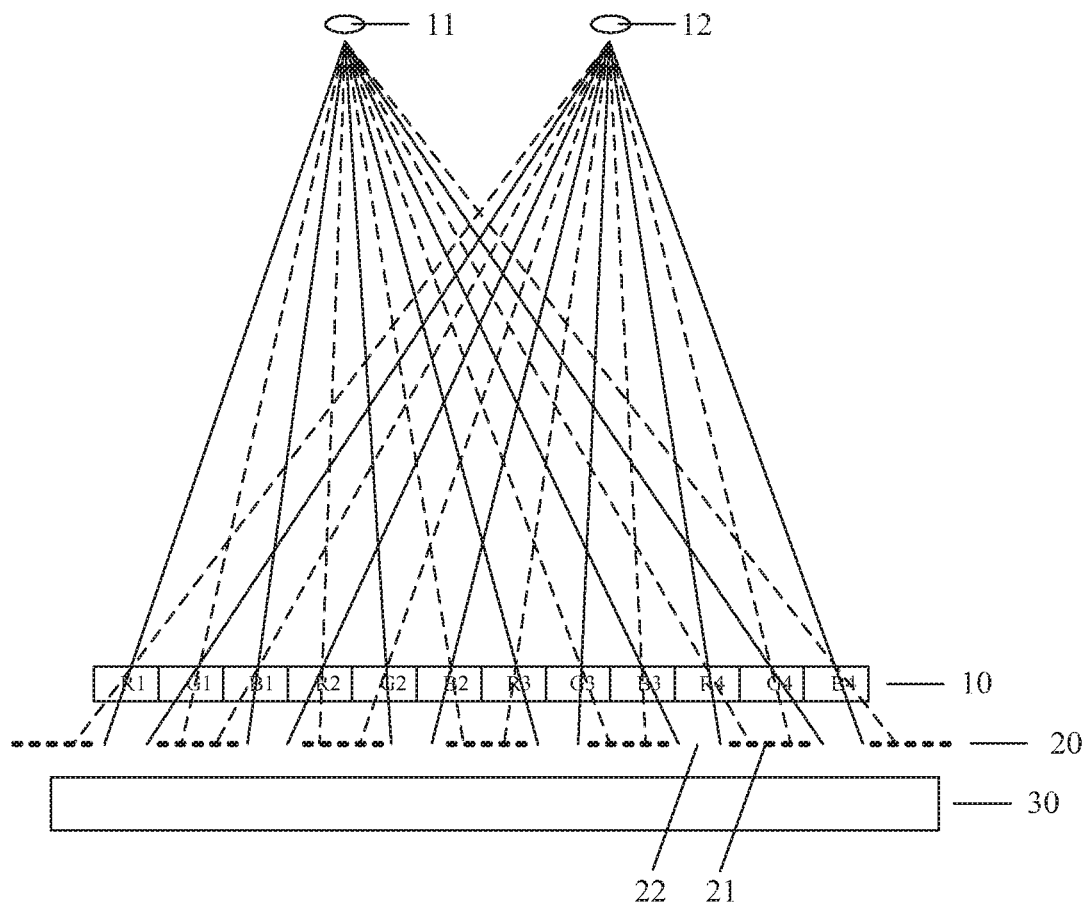
FIG. 4 is yet another schematic view showing the principle for the parallax barrier 3D display according to one embodiment of the present disclosure.

Referring to FIGS. 2-4, the present disclosure provides in some embodiments a parallax barrier 20, i.e., a slit grating, which includes a plurality of first stripes 21 separated from, and arranged parallel to, each other, and a plurality of second stripes 22 each arranged between the adjacent first stripes 21. Each second stripe 22 is a light-transmissible stripe and corresponds to a slit of the slit grating. Each first stripe 21 has light transmittance less than that of the light-transmissible stripe 22. In this way, different pixels may be viewed by a left eye and a right eye of a viewer through the parallax barrier 20, so as to form parallax images which are then combined by the viewer's brain to form a stereo image, and thereby achieve the 3D display.

In addition, the light transmittance of the first stripe 21 is arranged to be greater than zero, so that all the pixels may be viewed by both the left eye and the right eye of the viewer through the parallax barrier 20. As compared with the existing parallax barrier in which the first stripes 21 are opaque, it is able to improve the resolution and brightness for the 3D display, to reduce the power consumption, and prevent the occurrence of a blind region where the stereo image cannot be viewed.

The light transmittance is a ratio of an intensity of a light beam that has been incident on and transmitted through each first stripe 21 or light-transmissible stripe 22 to an intensity of the incident light beam.

To be specific, the first stripe 21 may have the light transmittance greater than zero and less than or equal to 10%, optionally 5%, and the light-transmissible stripe 22 may have the light transmittance greater than 95%. In the case that the first stripe 21 has the light transmittance greater than 10%, since the intensity of the light beam that has transmitted through the first stripes 21 is increased, crosstalk will easily occur between the light beam that has been transmitted through the first stripe 21 and the light beam that has been transmitted through the second stripe 22, and pixels viewed by the left eye of the viewer and the pixels viewed by the right eye of the viewer through the parallax barrier 20 tend to be identical. As a result, the parallax images cannot be formed, and it is unable for the viewer's brain to acquire a stereo image for the 3D display.

In the embodiments of the present disclosure, the first stripe between the adjacent light-transmissible stripe has the light transmittance greater than zero and less than the light transmittance of the light-transmissible stripe, so as to improve the resolution and brightness for the 3D display, reduce the power consumption, and prevent the occurrence of the blind region where the stereo image cannot be viewed.

Alternatively, the first stripes 21 of the parallax barrier 20 are of an identical width, and the light-transmissible stripes 22 are of an identical width, i.e., the slits (the light-transmissible stripes 22) of the slit grating are of an identical width and spaced apart from each other at an identical interval. Therefore, merely the even-numbered (or odd-numbered) pixels are viewed by the left eye 11 of the viewer, merely the odd-numbered (or even-numbered) pixels are viewed by the right eye 12 of the viewer, and both the pixels viewed by the left eye 11 and the pixels viewed by the right eye 12 are distributed evenly to provide images with even colors. As a result, it is able to improve the image display quality.

The first stripe 21 is of a width identical to an interval between the adjacent light-transmissible stripes 22, and the light-transmissible stripe 22 is of a width identical to an interval between the adjacent first stripes 21.

Of course, the light-transmissible stripes 22 of the parallax barrier 20 may also be of different widths and separated from each other at an identical interval, or of an identical width and separated from each other at different intervals, or of different widths and separated from each other at different intervals.

In an alternative embodiment, the parallax barrier 20 further includes a transparent substrate, the first stripes 21 are arranged on the transparent substrate, and the light-transmissible stripes 22 are formed on portions of the transparent substrate between the adjacent first stripes 21. The first stripe 21 is made of a material, the light transmittance of which may be controlled easily, e.g., polycarbonate. To be specific, the light transmittance of the first stripe 21 may be greater than zero and less than or equal to 10%, optionally 5%.

The transparent substrate may be a glass substrate, an organic resin substrate or a quartz substrate, and has the light transmittance of greater than 95%.

Alternatively, the first stripes 21 are of an identical width and arranged parallel to each other at an identical interval, so that the light-transmissible stripes 22 are also of an identical width and arranged parallel to each other at an identical interval accordingly. In this way, it is able to provide the 3D image with even colors, and thereby improve the image display quality.

In the embodiment of the present disclosure, the light-transmissible stripes 22 (i.e., the second stripes corresponding to the slits of the slit grating) are formed by the portions of the transparent substrate between the first stripes 21, so that a process for manufacturing the light-transmissible stripes 22 is omitted, and thus it is able to simplify the manufacture process.

During the actual manufacture process, the structure of the parallax barrier is not limited to the above embodiments. For example, a transparent substrate may be provided, and the first stripes 21 and the light-transmissible stripes 22 may be formed, e.g., printed, on the transparent substrate respectively and separated from each other.

The present disclosure further provides in some embodiments a display device, in particular a 3D display device, which includes a display panel and the above-mentioned parallax barrier.

According to the display device in the embodiments of the present disclosure, through the above-mentioned parallax barrier, it is able to improve the resolution and brightness for the 3D display, reduce the power consumption, and prevent the occurrence of the blind region where the stereo image cannot be viewed.

To be specific, the parallax barrier 20 may be arranged at a side of the display panel 10, wherein the side of the display panel 10 is configured for displaying an image, as shown in FIG. 2.

For a LCD device, it may further include a backlight source 30, and the parallax barrier 20 may be arranged at a side of the display panel 10 away from the backlight source 30, as shown in FIG. 3. Alternatively, the parallax barrier 20 may be arranged between the display panel 10 and the backlight source 30, as shown in FIG. 4.

For an organic light-emitting diode (OLED) display device or a plasma display device where no backlight source is required, the parallax barrier 20 may be arranged at a side of the display panel 10 for displaying an image, as shown in FIG. 2.

Taking a LCD device as an example, it may include a LCD panel 10, the backlight source 30, and the parallax barrier 20 arranged at a side of the display panel 10 away from the backlight source 30 (as shown in FIG. 3) or arranged between the display panel 10 and the backlight source 30 (as shown in FIG. 4). Light-emitting diodes (LEDs) may be selected as the backlight source 30, due to the LED' features such as an excellent color rendering index, a long service life and being mercury-free.

According to the embodiments of the present disclosure, the parallax barrier is used to achieve the 3D display using a slit grating. Each first stripe arranged between the adjacent light-transmissible stripes has the light transmittance greater than zero, so as to enable all the pixels to be viewed by both the left eye and the right eye of the viewer, thereby to improve the resolution and brightness for the 3D display and reduce the power consumption. In addition, each first stripe has the light transmittance less than that of the light-transmissible stripe, so as to generate parallax images for the left and right eyes respectively, thereby to generate a stereo image by the viewer's brain and achieve the 3D display. Furthermore, all the pixels may be viewed by both the left eye and the right eye of the viewer through the parallax barrier, so it is able to prevent the occurrence of a blind region for an existing parallax barrier where no stereo image can be viewed.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A parallax barrier, comprising a plurality of first stripes and a plurality of second stripes, wherein the plurality of first stripes are separated from, and arranged parallel to, each other, and the plurality of second stripes are light-transmissible stripes each arranged between adjacent first stripes, wherein the first stripes have light transmittance less than that of the light-transmissible stripes, and the light transmittance of the first stripes is greater than zero and less than or equal to 10%, and wherein the light-transmissible stripes are of different widths and are separated from each other at different intervals.

2. The parallax barrier according to claim 1, wherein the first stripes are of different widths.

3. The parallax barrier according to claim 1, further comprising a transparent substrate, wherein the first stripes are arranged on the transparent substrate, and each of the light-transmissible stripes is formed on the transparent substrate and arranged between the adjacent first stripes.

4. The parallax barrier according to claim 3, wherein the first stripes are made of polycarbonate.

5. The parallax barrier according to claim 1, wherein the first stripes have the light transmittance of 5%.

6. The parallax barrier according to claim 1, wherein the light-transmissible stripes have the light transmittance of being greater than 95%.

7. The parallax barrier according to claim 1, wherein the light transmittance is a ratio of an intensity of a light beam that has been incident on and transmitted through the first stripes or the light-transmissible stripes to an intensity of the incident light beam.

8. The parallax barrier according to claim 3, wherein the transparent substrate is a glass substrate, an organic resin substrate or a quartz substrate.

9. A display device, comprising a display panel and the parallax barrier according to claim 1.

10. The display device according to claim 9, wherein the parallax barrier is arranged at a side of the display panel for displaying an image.

11. The display device according to claim 9, further comprising a backlight source, wherein the parallax barrier is arranged between the display panel and the backlight source or at a side of the display panel away from the backlight source.

12. The parallax barrier according to claim 2, further comprising a transparent substrate, wherein the first stripes are arranged on the transparent substrate, and each of the light-transmissible stripes is formed on the transparent substrate and arranged between the adjacent first stripes.

13. The parallax barrier according to claim 12, wherein the first stripes are made of polycarbonate.

14. The parallax barrier according to claim 2, wherein the light transmittance is a ratio of an intensity of a light beam that has been incident on and transmitted through the first stripes or the light-transmissible stripes to an intensity of the incident light beam.

15. The parallax barrier according to claim 3, wherein the light transmittance is a ratio of an intensity of a light beam that has been incident on and transmitted through the first stripes or the light-transmissible stripes to an intensity of the incident light beam.

16. The parallax barrier according to claim 12, wherein the light transmittance is a ratio of an intensity of a light beam that has been incident on and transmitted through the first stripes or the light-transmissible stripes to an intensity of the incident light beam.

17. The parallax barrier according to claim 12, wherein the transparent substrate is a glass substrate, an organic resin substrate or a quartz substrate.

18. The display device according to claim 9, wherein the first stripes are of different widths.

19. The display device according to claim 9, the parallax barrier comprises a transparent substrate, wherein the first stripes are arranged on the transparent substrate, and each of the light-transmissible stripes is formed on the transparent substrate and arranged between the adjacent first stripes.

20. The display device according to claim 18, the parallax barrier comprises a transparent substrate, wherein the first stripes are arranged on the transparent substrate, and each of the light-transmissible stripes is formed on the transparent substrate and arranged between the adjacent first stripes.

* * * * *